(12) United States Patent
Sakagami et al.

(10) Patent No.: US 12,369,694 B2
(45) Date of Patent: Jul. 29, 2025

(54) WATERPROOF FASTENER STRINGER AND METHOD OF PRODUCING THE SAME

(71) Applicant: YKK Corporation, Tokyo (JP)

(72) Inventors: Yuki Sakagami, Toyama (JP); Mineto Terada, Toyama (JP); Nariaki Yamamoto, Toyama (JP); Steven Thomas, Cheshire (GB); Mark Brady, Cheshire (GB)

(73) Assignee: YKK CORPORATION, Tokyo (JP)

( * ) Notice: Subject to any disclaimer, the term of this patent is extended or adjusted under 35 U.S.C. 154(b) by 125 days.

(21) Appl. No.: 18/033,188

(22) PCT Filed: Oct. 22, 2020

(86) PCT No.: PCT/JP2020/039775
§ 371 (c)(1),
(2) Date: Apr. 21, 2023

(87) PCT Pub. No.: WO2022/085166
PCT Pub. Date: Apr. 28, 2022

(65) Prior Publication Data
US 2023/0397700 A1  Dec. 14, 2023

(51) Int. Cl.
*B29C 45/14* (2006.01)
*A44B 19/32* (2006.01)
(Continued)

(52) U.S. Cl.
CPC .............. *A44B 19/32* (2013.01); *A44B 19/34* (2013.01); *B29C 45/14344* (2013.01);
(Continued)

(58) Field of Classification Search
CPC ... A44B 19/32; A44B 19/34; B29C 45/14344; B29C 45/14; B29C 2045/14885;
(Continued)

(56) References Cited

U.S. PATENT DOCUMENTS 10,080,405 B2 *   9/2018   Cheng ................... A44B 19/08
10,144,160 B2 *  12/2018   Cheng ................... B29C 45/00
(Continued)

FOREIGN PATENT DOCUMENTS

CN   104026815 A   9/2014
CN   104379018 A   2/2015
(Continued)

OTHER PUBLICATIONS

International Search Report (with translation) and Written Opinion received in corresponding International Application No. PCT/JP2020/039775, mailed Dec. 22, 2020, in 10 pages.
(Continued)

*Primary Examiner* — Ryan J. Walters
(74) *Attorney, Agent, or Firm* — Procopio, Cory, Hargreaves & Savitch LLP

(57) ABSTRACT

Through-holes are formed at a constant pitch along a side-edge portion of a fastener tape where a tape base fabric is covered by a waterproof layer, the through-holes piercing the fastener tape. Plasma treatment or corona treatment is applied to the side-edge portion of the fastener tape so as to form an activation region on a surface of the waterproof layer on one or both sides of the fastener tape. Injection molding of fastener elements is performed to attach the fastener elements to the side-edge portion of the fastener tape. Melted resin adheres to the activation region and fills the through-hole before solidifying into the fastener element.

16 Claims, 11 Drawing Sheets

(51) Int. Cl.
  *A44B 19/34* (2006.01)
  *B29D 5/08* (2006.01)
  *D06M 10/02* (2006.01)
  *B29L 5/00* (2006.01)

(52) U.S. Cl.
  CPC ............. *B29D 5/08* (2013.01); *D06M 10/025* (2013.01); *B29C 45/14* (2013.01); *B29C 2045/14885* (2013.01); *B29L 2005/00* (2013.01)

(58) Field of Classification Search
  CPC ......... B29D 5/08; B29D 5/00; D06M 10/025; B29L 2005/00
  See application file for complete search history.

(56) References Cited

U.S. PATENT DOCUMENTS

| | | | | |
|---|---|---|---|---|
| 10,426,233 | B2* | 10/2019 | Numata | ............... A44B 19/42 |
| 2007/0226966 | A1 | 10/2007 | Tominaga | |
| 2013/0180087 | A1* | 7/2013 | Matsuda | ............... A44B 19/06 |
| | | | | 24/411 |
| 2015/0157096 | A1 | 6/2015 | Mikuma et al. | |
| 2017/0113384 | A1* | 4/2017 | Cheng | ............... B29C 45/14344 |
| 2018/0078007 | A1 | 3/2018 | Numata et al. | |

FOREIGN PATENT DOCUMENTS

| | | | |
|---|---|---|---|
| GB | 2512792 | A | 8/2014 |
| JP | S59-196231 | A | 11/1984 |
| JP | H10-243805 | A | 9/1998 |
| JP | H11-124494 | A | 5/1999 |
| JP | 2007-267935 | A | 10/2007 |
| JP | 2008105420 | A | 5/2008 |
| JP | 2012-116200 | A | 6/2012 |
| JP | 2017-077916 | A | 4/2017 |
| WO | 2016/157536 | A1 | 10/2016 |
| WO | 2017/064759 | A1 | 4/2017 |
| WO | 2017/072925 | A1 | 5/2017 |
| WO | 2017162344 | A1 | 9/2017 |

OTHER PUBLICATIONS

International Preliminary Report on Patentability received in corresponding International Application No. PCT/JP2020/039775, issued Apr. 13, 2023, in 5 pages.
Examination Report under Section 18(3) issued in corresponding GB Patent application No. 2305354.9, dated May 2, 2024, 5 pages.
Office Action of Chinese application No. 202080105645.5 issued on Mar. 29, 2025.

* cited by examiner

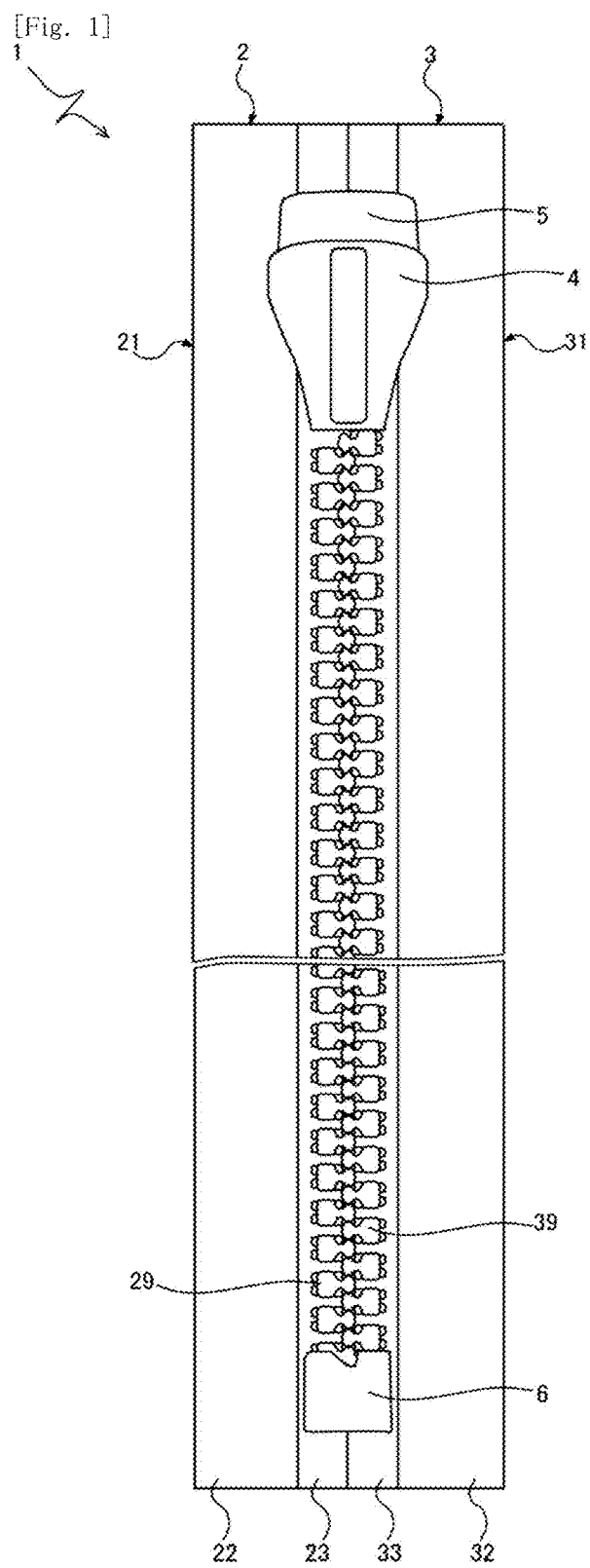

[Fig. 2]
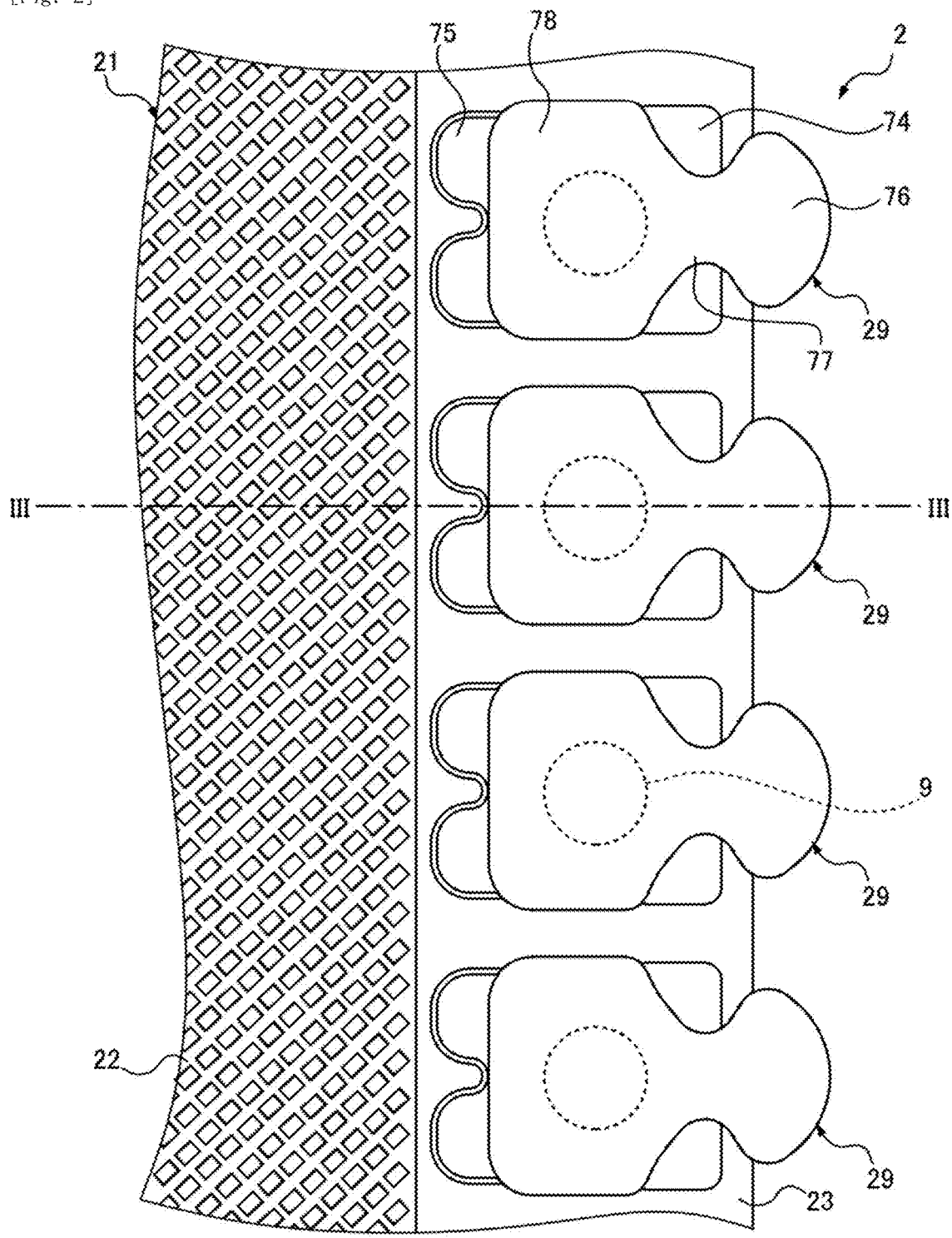

[Fig. 3]
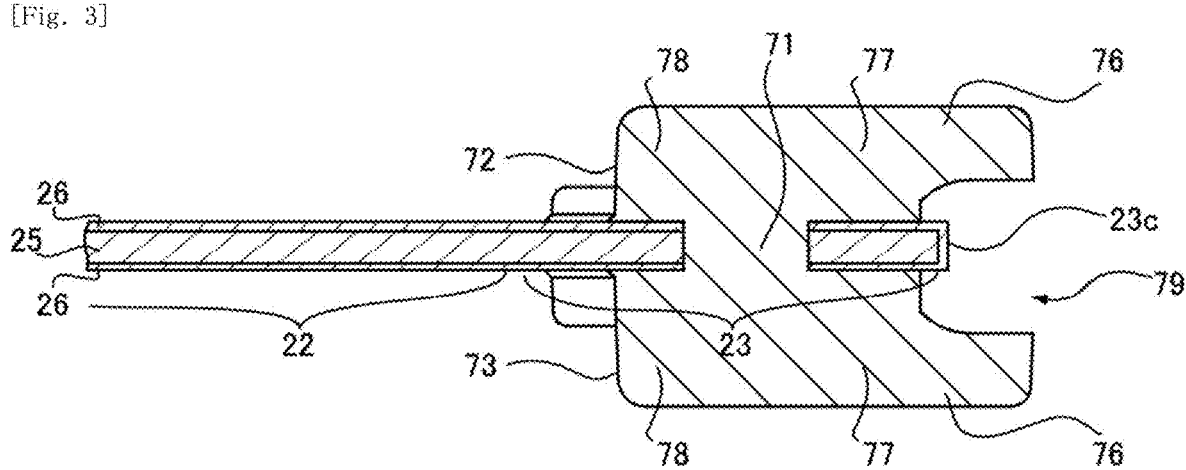

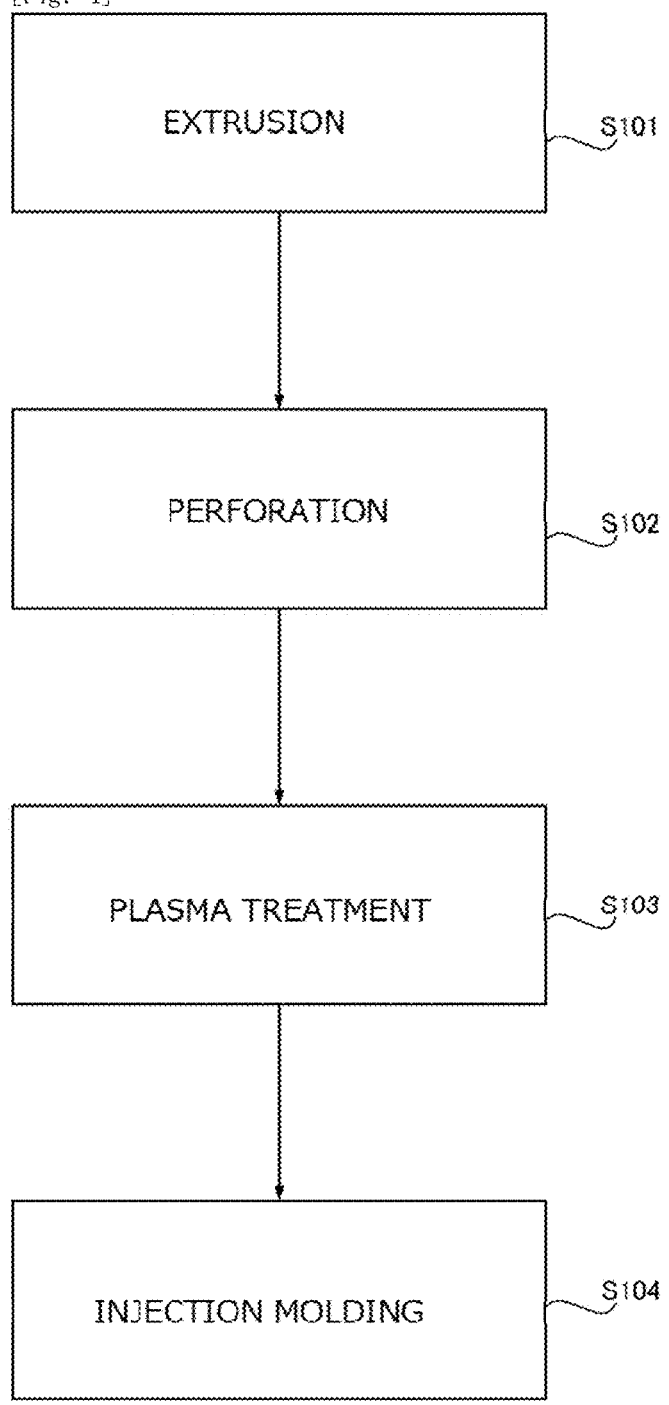

[Fig. 5]
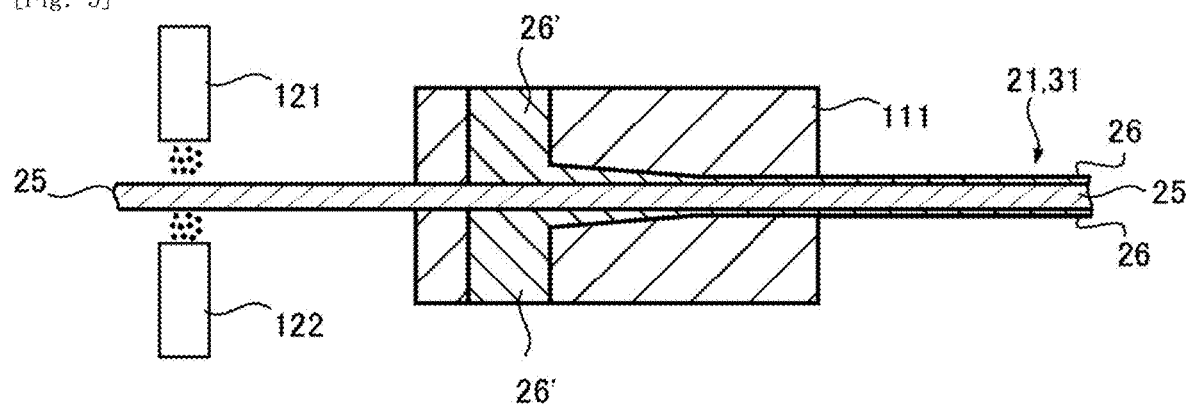
[Fig. 6]
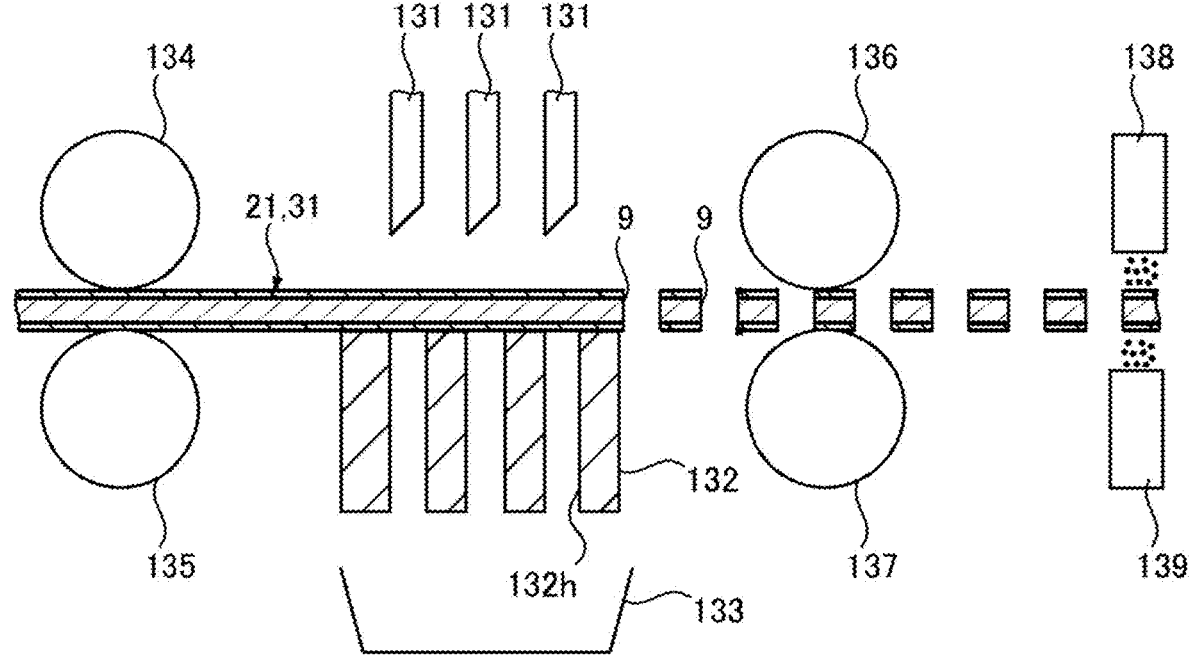

[Fig. 7]
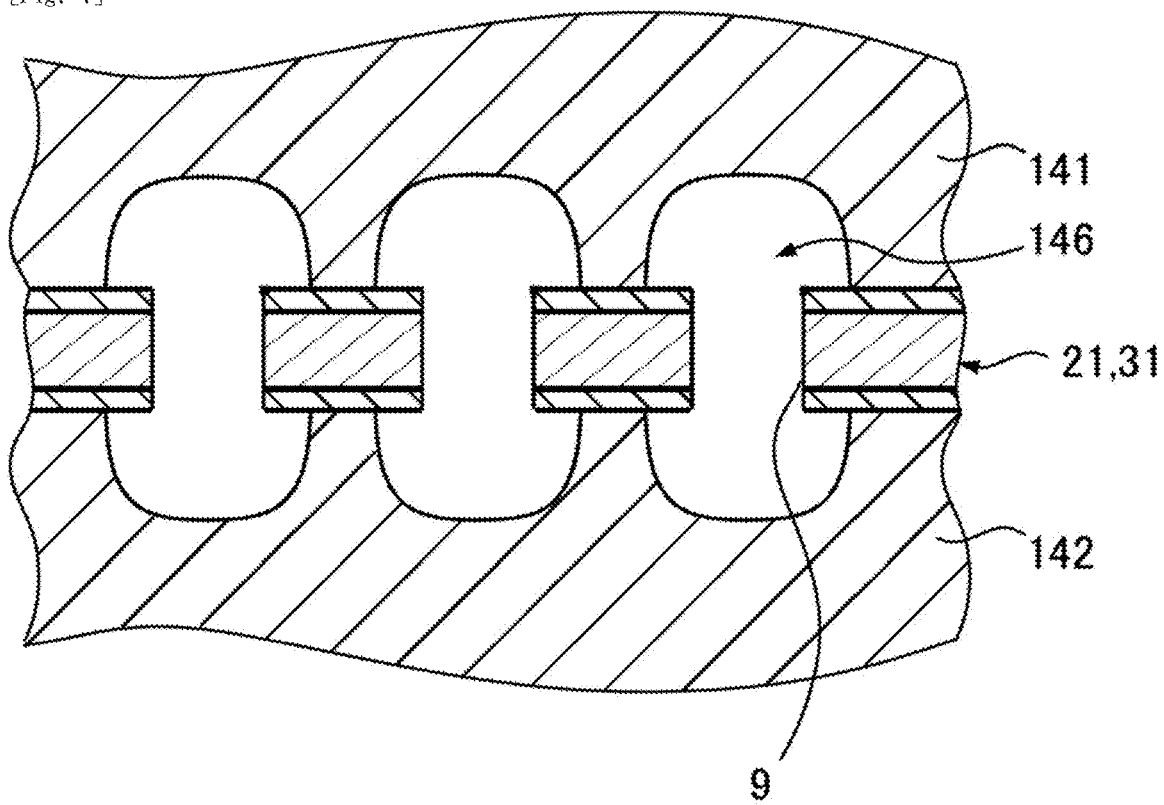
[Fig. 8]
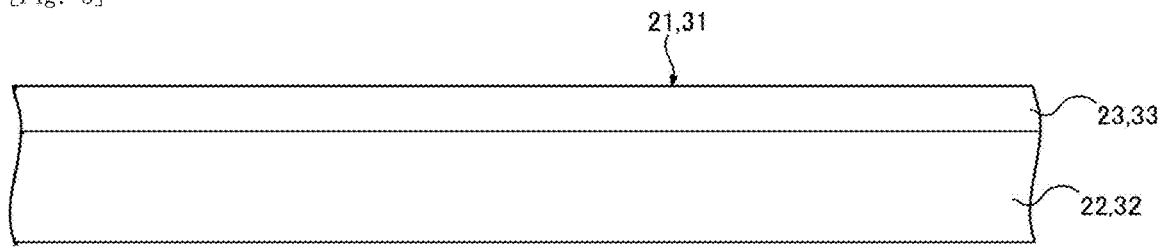
[Fig. 9]
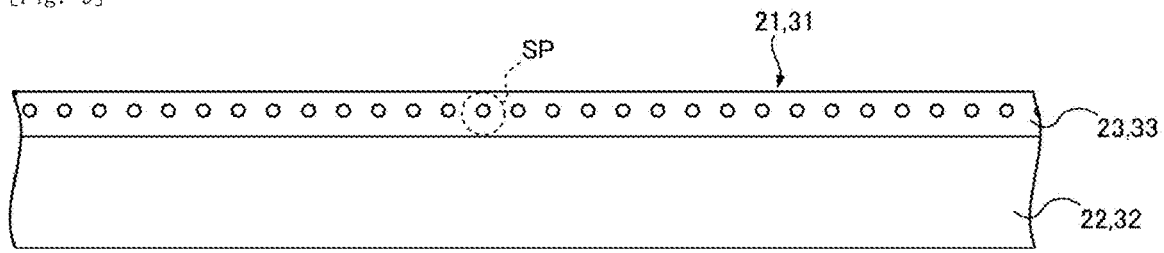
[Fig. 10]
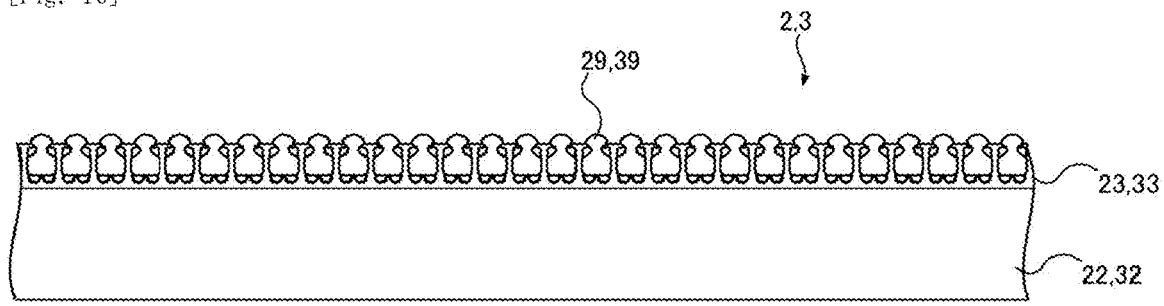

[Fig. 11]
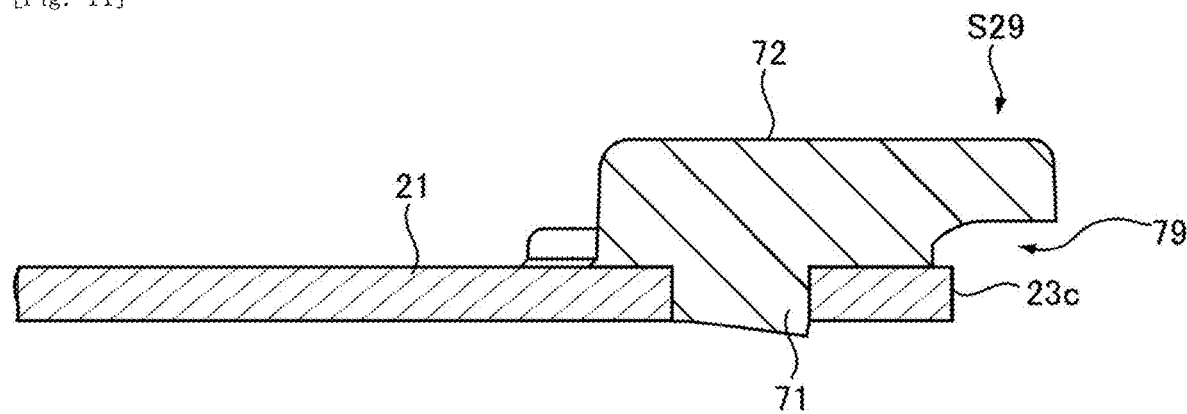
[Fig. 12]
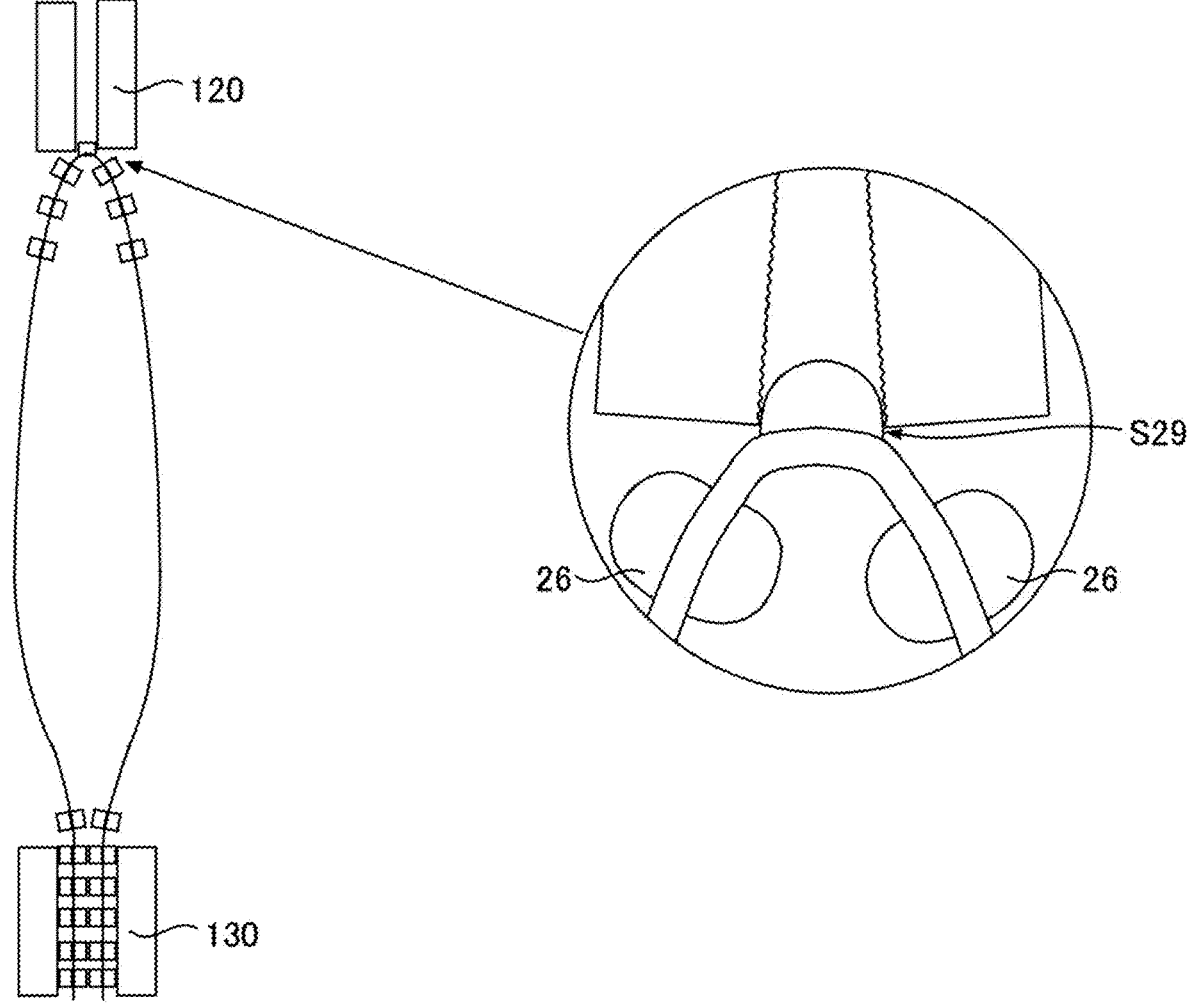

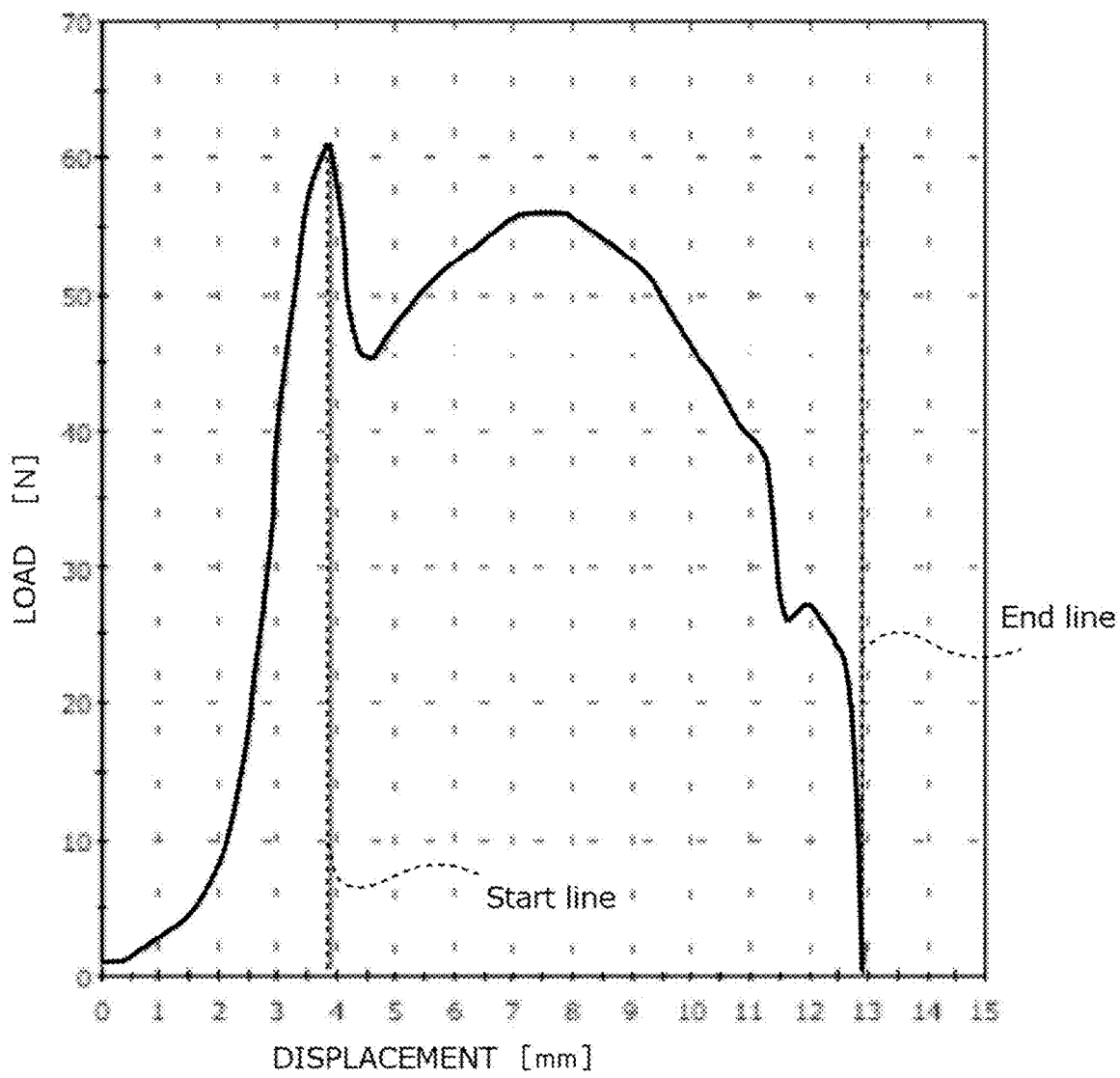
[Fig. 13]

[Fig. 14]
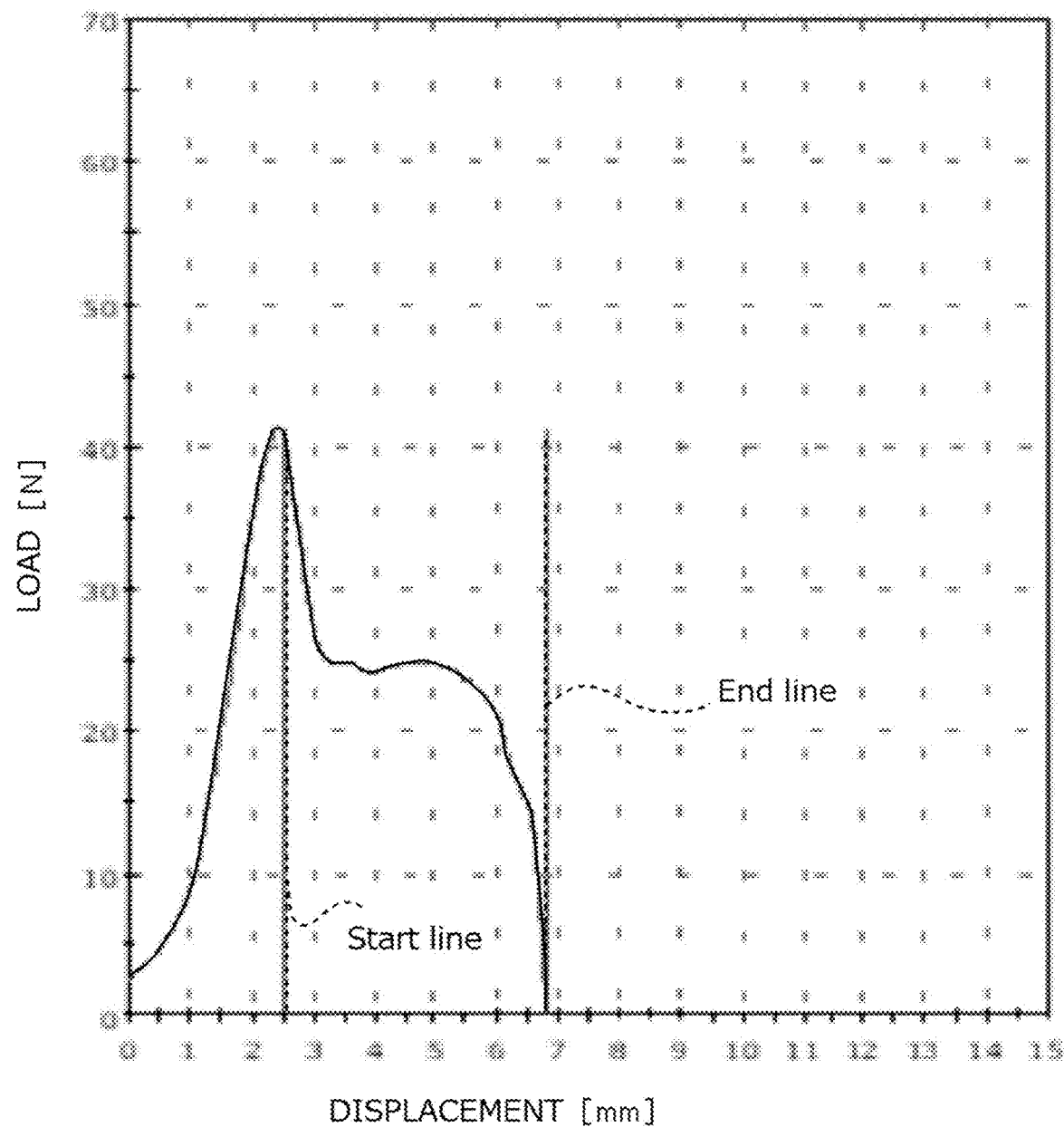

[Fig. 15]
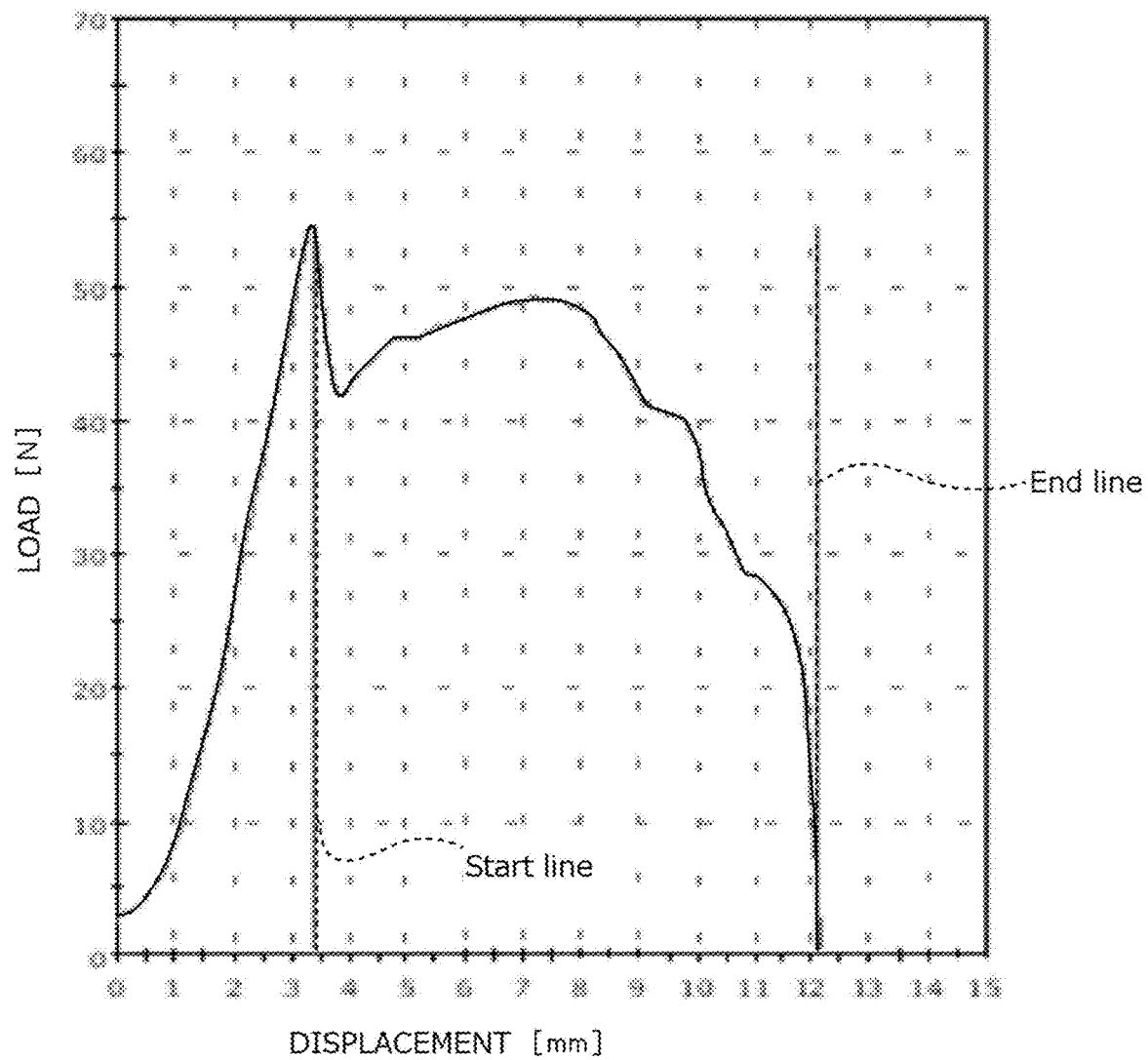
[Fig. 16]
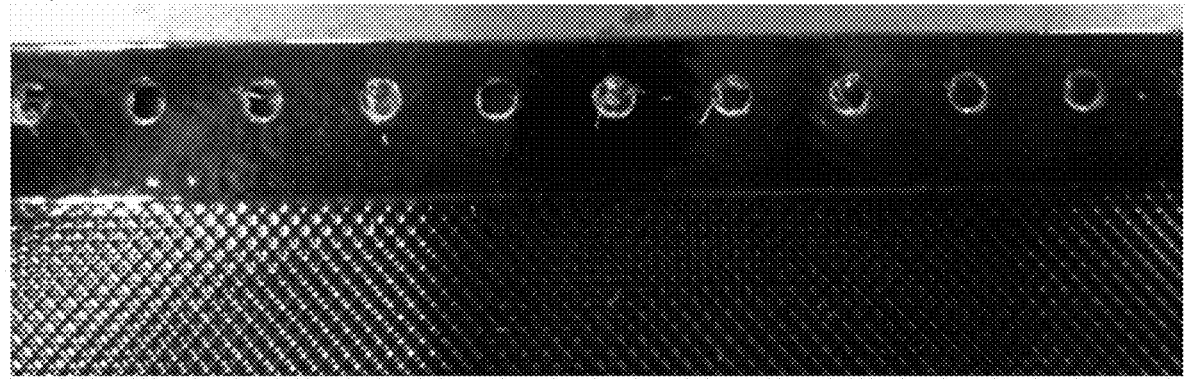

[Fig. 17]
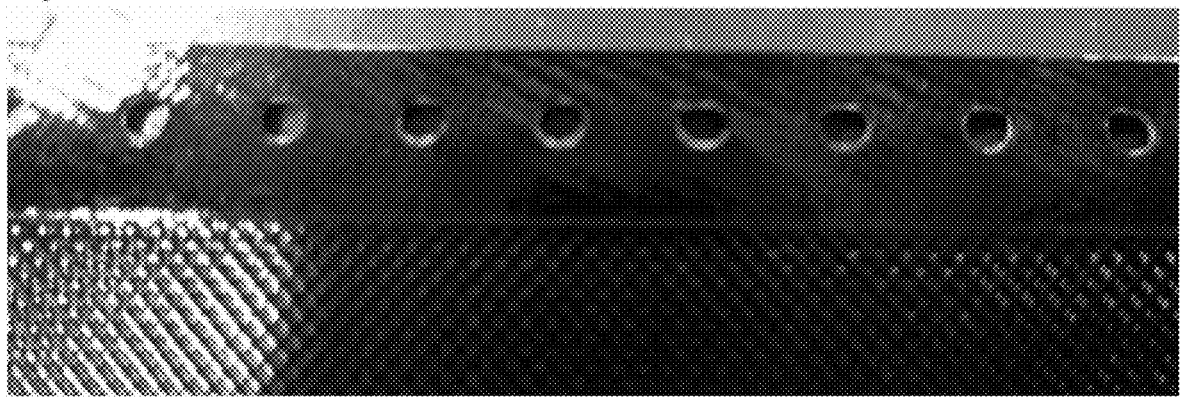

WATERPROOF FASTENER STRINGER AND METHOD OF PRODUCING THE SAME

CROSS-REFERENCE TO RELATED APPLICATIONS

This application is a US national stage application of International Application PCT/JP2020/039775, filed Oct. 22, 2020, the contents of which are incorporated by reference.

TECHNICAL FIELD

The present disclosure is related to a waterproof fastener stringer and a method of producing the same.

BACKGROUND ART

Waterproof slide fasteners have been in use from past. Traditionally, the waterproof slide fasteners have been used in a field of marine sports and products such as wet suits, and the number of opening and closing thereof is not large in general. Also, moving a slider for opening and closing would require not a small degree of force as its sliding resistance is large.

Patent literature 1 relates to waterproof slide fasteners and discloses a combination of a waterproof layer made of polyurethane elastomer and fastener elements made of a polymer alloy consisting of polyurethane resin and ABS resin. In particular, the polyurethane elastomer is employed as the waterproof layer in order to facilitate high frequency welding of waterproof slide fasteners attached to objects made of material based on polyurethane (paras. 0010, 0016 and 0025 of the same literature). This literature points out defects in cases where polyurethane resin is employed as material of fastener elements (para. 0017 thereof) and finally employs the polymer alloy consisting of polyurethane resin and ABS resin (para. 0018 thereof).

Patent literature 2 discloses that plasma is used to remove protrusions of tape fibers. Patent literatures 3 and 4 disclose that plasma treatment or corona treatment is applied for surface modification.

CITATION LIST

Patent Literature

[Patent literature 1] Japanese patent application Laid-open No. 2007-267935
[Patent literature 2] Chinese patent application Laid-open No. 104026815
[Patent literature 3] International Publication No. 2017/064759
[Patent literature 4] Japanese patent application Laid-open No. 2017-77916

SUMMARY

Technical Problem

Fastener elements are placed in chemically severe environment in some cases, facilitating the occurrence of "element-turn". For example, a lubricant (e.g. grease) other than recommendable lubricants may be applied to the rows of fastener elements for improved sliding motion of slider. When the operation of opening and closing of slide fastener is repeated with sufficient force under such unforeseen circumstances, it has been observed that the element-turn occurs regardless of few times of the repeated operation of opening and closing of slide fastener. Note that "element-turn" indicates a rotation of a fastener element on a surface of fastener tape (i.e. on a surface of waterproof layer) as the fastener element is subjected to repeating force from a slider when opening and closing a slide fastener.

The more times the slide fastener is operated to be open and closed, the higher the occurrence probability of element-turn. Therefore, it would be beneficial to suppress the element-turn even in cases in which the fastener elements are not placed in chemically severe environments.

Solution to Problem

Based on a new technical problem of higher likelihood of element-turn when the fastener elements are placed in chemically severe environment, the following inventions are invented by the present inventors.

A method of producing a waterproof fastener stringer according to an aspect of the present disclosure includes: forming through-holes at a constant pitch along a side-edge portion of a fastener tape where a tape base fabric is covered by a waterproof layer, the through-holes piercing the fastener tape; applying a plasma treatment or corona treatment to the side-edge portion of the fastener tape so as to form an activation region on a surface of the waterproof layer on one or both sides of the fastener tape; and performing an injection molding of fastener elements to attach the fastener elements to the side-edge portion of the fastener tape, a melted resin adhering to the activation region and filling the through-hole before solidifying into the fastener element.

Plasma treatment or corona treatment is known as an approach to increase the wettability of surface. However, if the wettability of surface of fastener tape (particularly, a surface of waterproof layer) were increased, short shot or burr may likely be caused during injection molding of fastener element. This is because the increased wettability of the surface of the waterproof layer affects the flow of melted resin in a mold cavity. The short shot may result in lowered adhesion energy of fastener element to the waterproof layer. Formation of burr is not limited to waste of material but increases an inspection burden of appearance of slide fastener products, possibly resulting in lowered yield rate of slide fasteners in some cases. In spite of the above presumptions, the present inventors apply plasma treatment or corona treatment to a surface of waterproof layer to which fastener elements are to be attached prior to injection molding to attach fastener elements to fastener tape. As a result of this, the adhesion energy of fastener element to the surface of waterproof layer would be increased remarkably, and the occurrence of element-turn would be notably reduced.

Number of opening-closing times of waterproof slide fastener is not large in general, and a large number of its maximum opening-closing times is not estimated. The suppressed occurrence of element-turn in the waterproof slide fastener allows increased number of maximum opening-closing times of waterproof slide fastener and its deployment to usages where the number of opening-closing times is large.

In some cases, the plasma treatment or corona treatment is applied to the side-edge portion of the fastener tape after the through-holes are formed in the side-edge portion of the fastener tape. Thread or fiber of the tape base fabric in the through-hole is removed by applying the plasma treatment or corona treatment to the side-edge portion of the fastener tape.

In some cases, said applying a plasma treatment or corona treatment to the side-edge portion of the fastener tape so as to form an activation region on a surface of the waterproof layer on one or both sides of the fastener tape includes: forming a plasma-irradiated region on the surface of the waterproof layer in the side-edge portion of the fastener tape; and conveying the fastener tape from an upstream side to a downstream side, wherein the activation region is formed continuously along an elongation direction of the fastener tape.

In some cases, a spot diameter of the plasma-irradiated region is greater than a diameter of the through-hole. A spot diameter of the plasma-irradiated region may be less than 2 times or 1.5 times of a width of the side-edge portion.

In some cases, said applying a plasma treatment or corona treatment to the side-edge portion of the fastener tape so as to form an activation region on a surface of the waterproof layer on one or both sides of the fastener tape is performed to skip a portion where a stop member is to be formed in the side-edge portion of the fastener tape. The plasma may be emitted intermittently from the plasma emitter or the formation of the plasma-irradiated region (the plasma spot) on the fastener tape may be blocked intermittently.

In some cases, said production method further includes applying a plasma treatment or corona treatment to the tape base fabric before the tape base fabric is covered by the waterproof layer. This may include forming a plasma irradiated region on a surface of the tape base fabric; and conveying the tape base fabric from an upstream side toward a downstream side.

Through the extrusion, the waterproof layer may be formed onto both of the upper and lower surfaces of the tape base fabric. The fastener tape may have a tape main portion with emboss patterns on its both surfaces, and a side-edge portion with smooth surfaces on its both surfaces. The waterproof layer may be made of polyurethane, and the fastener elements may be made of polyamide.

In some cases, the fastener element includes: a filling portion that fills the through-hole; an upper portion connected to an upper end of the filling portion; and a lower portion connected to a lower end of the filling portion. Each of the upper and lower portions has a head, a neck and a body. End face of the side-edge portion of the fastener tape is positioned in a groove between the head of the upper portion and the head of the lower portion.

In some cases, further included are removing one of the upper portion and the lower portion of one fastener element positioned at a middle between both ends of the waterproof fastener stringer; moving a remainder of the upper portion and the lower portion away from an overlap of the both ends of the waterproof fastener stringer and measuring a load required for displacement of the remainder to generate a load curve; and calculating an area of the load curve in an interval in which a measured load value changes from an initial maximum value to zero, wherein S>200 is satisfied where S denotes the area (unit: N*mm) of the load curve in the interval.

A waterproof fastener stringer according to another aspect of the present disclosure may include: a fastener tape where a tape base fabric is covered by a waterproof layer; and resin-made fastener elements adhering to the fastener tape, each of the fastener elements including at least one filling portion that fills a through-hole piercing the fastener tape, an upper portion connected to an upper end of the at least one filling portion, and a lower portion connected to a lower end of the at least one filling portion, wherein S>200 is satisfied where S denotes an area (unit: N*mm) of a load curve in an interval, said load curve generated based on measurement of load required for displacement of a remainder of the upper portion and the lower portion away from an overlap of the both ends of the waterproof fastener stringer after one of the upper portion and the lower portion of one fastener element positioned at a middle between both ends of the waterproof fastener stringer is removed, and said area of the load curve is calculated in the interval in which a measured load value changes from an initial maximum value to zero.

In connection with the above-described feature, the load curve is plotted based on measurements of load applied to the remainder of the upper or lower portion by each 0.1 mm displacement of the remainder of the upper or lower portion. Furthermore, the above-described area is determined by integrating the load curve in the following way. Firstly, setting a load value at which a measured load value is maximum as a start point of integration, and setting a load value at which the measured load value is zero as an end point of integration. Calculating small area based on successively measured two load values, and repeating this calculation from the start point of integration toward the end point of integration. The small area is calculated by a formula=((first load value+second load value)/2)*0.1, where the first and second load values are successively measured values; 0.1 corresponds to the 0.1 mm of the measurement interval. By summing the small areas calculated as such, the area of the load curve is determined. Note that, a gripper may be used for a purpose of displacement of the remainder of upper or lower portion. In this case, the gripper and the remainder of upper or lower portion move together, and thus the load curve is plotted based on measurements of load applied to the gripper by 0.1 mm displacement of the gripper.

In some cases, the maximum value is equal to or greater than 50 N or the maximum value is equal to or greater than 58 N.

In some cases, the element-turn is not caused even at 10,000 times of opening-closing test in which a grease is applied to the fastener elements, a movement range of slider is set to 600 mm and a movement speed of slider is set to 900 mm/s. Additionally, a force of 3 kgf in an elongation direction and a force of 0.1 kgf in a width direction of the slide fastener are continuously applied. Preferably, the element-turn is not caused even at 20,000 times of the opening-closing test.

In connection to a fastener stringer to be tested in the load test or opening-closing test, an area of a fastener element adhering to a surface of a waterproof layer at one side of the fastener stringer may be 17.08 mm$^2$±0.2 mm$^2$. This area may be 17.08 mm$^2$±0.1 mm$^2$, if dispersion of area is small. Here, 0.1 mm$^2$ indicates a dispersion corresponding to 17.08×0.05=0.854. The dispersion may reflect a dispersion of thermal shrinkage of material and so on. Note that, this adhesion area does not include an area of the through-hole (an area defined by inner wall of the through-hole either). The adhesion area can be determined by subtracting a cross-sectional area (2.27 mm$^2$) of the through-hole in a plane that is coplanar with a tape surface of fastener tape from a cross-sectional area (19.35 mm$^2$) of fastener element in the plane.

Advantageous Effects of Invention

Aspect of the present disclosure provides waterproof slide fasteners with suppressed occurrence of element-turn compared with prior ones.

BRIEF DESCRIPTION OF DRAWINGS

FIG. 1 is a schematic top view of a slide fastener according to an aspect of the present disclosure.

FIG. 2 is a schematic partial top view of a left fastener stringer, dash circles denote through-holes formed at a constant pitch in a fastener tape.

FIG. 3 is a schematic cross-sectional view taken along an alternate long and short dash line III-III in FIG. 2.

FIG. 4 is a schematic block chart regarding a production apparatus of slide fasteners according to an aspect of the present disclosure.

FIG. 5 is a schematic view illustrating a process of extrusion.

FIG. 6 is a schematic view illustrating a process of perforation.

FIG. 7 is a schematic view illustrating a process of injection molding.

FIG. 8 is a schematic view of a fastener tape where a tape base fabric is covered by a waterproof layer.

FIG. 9 is a schematic view of a perforated fastener tape.

FIG. 10 is a schematic view of a fastener tape to which fastener elements adhere.

FIG. 11 is a schematic view illustrating a fastener stringer where a lower portion of one fastener element is removed.

FIG. 12 is a schematic view referred to describe a method of tensile test.

FIG. 13 is a graph of load curve as a result of the tensile test of working example 1.

FIG. 14 is a graph of load curve as a result of the tensile test of comparative example 1.

FIG. 15 is a graph of load curve as a result of the tensile test of working example 2.

FIG. 16 is a photograph of a part of fastener tape before plasma treatment.

FIG. 17 is a photograph of a part of fastener tape after plasma treatment.

DESCRIPTION OF EMBODIMENTS

Hereinafter, various embodiments and features will be described with reference to drawings. A skilled person in the art would be able to combine respective embodiments and/or respective features without requiring excess descriptions, and would appreciate synergistic effects of such combinations. Overlapping descriptions among the embodiments are basically omitted. Referenced drawings aim mainly for describing inventions and are simplified for the sake of convenience of illustration. The respective features should be appreciated as universal features not only effective to waterproof fastener stringers and methods of producing the same presently disclosed but also effective to other various waterproof fastener stringers and methods of producing the same not disclosed in the present specification.

As shown in FIG. 1, a waterproof slide fastener 1 is a belt-like member elongated in a front-rear direction and having a narrow width in a left-right direction, and has left and right waterproof fastener stringers 2 and 3, a slider 4 to engage and disengage the left and right waterproof fastener stringers 2 and 3, a front stop 5 to connect the left and right waterproof fastener stringers 2 and 3, and a rear stop 6 to connect the left and right waterproof fastener stringers 2 and 3. Each of the fastener stringer 2 and 3 has a waterproof fastener tape 21,31 elongated in the front-rear direction, and a plurality of fastener elements 29,39 arranged on a side-edge portion 23,33 of the fastener tape 21,31 at a constant pitch along the front-rear direction. Note that the remainder of the fastener tape 21,31 other than the side-edge portion 23,33 would be referred to as a tape main portion 22,32. The tape main portion 22,32 is wider than the side-edge portion 23,33 in the left-right direction.

In the present specification, the front-rear direction matches a direction the slider 4 moves to open and shut the slide fastener 1. Left-right direction is orthogonal to the front-rear direction and parallel to a tape surface of the fastener tape 21, 31. Up-down direction is orthogonal to the front-rear and to the tape surface of the fastener tape 21, 31. The tape surface of the fastener tape 21,31 is a surface for defining a thickness of the fastener tape 21, 31.

With reference to FIGS. 2 and 3, a configuration of the left fastener stringer 2 will be described. Note that the configuration of the right fastener stringer 3 is equivalent to that of the left fastener stringer 2, and the description thereof will be thus omitted. As shown in FIGS. 2 and 3, through-holes 9 are formed at a constant pitch along the front-rear direction in the side-edge portion 23 of the fastener tape 21. The fastener element 29 includes a filling portion 71 filling the through-hole 9, an upper portion 72 connected to an upper end of the filling portion 71, and a lower portion 73 connected to a lower end of the filling portion 71. Each of the upper and lower portions 72 and 73 has a head 76, a neck 77, and a body 78. Optionally, each of the upper and lower portions 72 and 73 has shoulders 74 and fins 75 which are both thinner than the head 76, the neck 77 and the body 78. The fins 75 extend from the body 78 toward the tape main portion 22. The shoulders 74 extend from the body 78 toward the head 76 on the both sides of the neck 77.

The side-edge portion 23 of the fastener tape 21 protrudes rightward in the groove 79 between the head 76 of the upper portion 72 and the head 76 of the lower portion 73, and its right-side end face 23c is exposed in the groove 79. In the right fastener stringer 3, the side-edge portion 33 of the fastener tape 31 protrudes leftward in the groove 79 between the head 76 of the upper portion 72 and the head 76 of the lower portion 73, and its left-side end face is exposed in the groove 79. The right-side end face 23c of the fastener tape 21 and the left-side end face of the fastener tape 31 are opposed to each other and could be brought into direct contact with each other. As the left and right fastener elements 29 and 39 are engaged in accordance with forward movement of the slider 4, the right-side end face 23c of the fastener tape 21 and the left-side end face of the fastener tape 31 are brought into direct contact (preferably pressure contact), thus preventing the fluid flow in the up-down direction.

The fastener tape 21 has a tape base fabric 25 of woven fabric or knitted fabric or mixture of the two, and a waterproof layer 26 that covers sides (i.e. the upper and lower surfaces and the left and right end faces) of the tape base fabric 25. The tape base fabric 25 is woven and/or knitted from threads of synthetic resin, and has a multiplicity of pores through which a fluid is allowed to flow. For example, in cases where the tape base fabric 25 is woven from plural warp threads and one weft thread, openings are formed between the warp threads and similarly openings are formed between laterally extending adjacent portions of the weft thread. There is a possibility that a fluid flows through such openings between the upper and lower surfaces of the tape base fabric 25. The waterproof layer 26 is formed onto the tape base fabric 25 to seal the above described openings of the tape base fabric 25.

Note that embossed patterns may be formed in the upper and lower surfaces of the waterproof layer 26 within the area of the tape main portion 22,32 (See FIG. 2). In contrast, no embossed pattern is formed in the upper and lower surfaces of the side-edge portion 23,33; i.e. these surfaces are smooth surfaces.

There is no limitation on material used for the waterproof layer 26 and the fastener element 29,39. For example, the waterproof layer 26 may be made of polyurethane-based, polyester-based, polyamide-based or vinyl chloride-based thermoplastic elastomer (example of the polyester-based thermoplastic elastomer is commercially available from DU PONT-TORAY CO., LTD.; a product name of which reads "Hytrel" (registered trademark in Japan). The fastener elements 29,39 are made of one or more thermoplastic resins selected from a group consisting of polyacetal, polyamide, polypropylene, polybutylene terephthalate, and polycarbonate. Alternatively, the fastener elements 29,39 are made of a polymer alloy consisting of polyurethane resin and ABS resin. Suitable combination is that the waterproof layer 26 is made of polyurethane and the fastener element 29,39 is made of polyamide.

The slider 4 has a top wing, a bottom wing and a coupling pillar that connects the top and bottom wings. Y-shaped element passage is formed in the slider 4. Specifically, the coupling pillar is arranged at the front end of the slider 4 and front mouths are formed on the left and right sides of the coupling pillar. A rear mouth is located at the rear end of the slider 4. The left and right disengaged fastener elements 29 and 39 enter the inside of the slider 4 via the left and right front mouths, then are engaged at a rear position of the coupling pillar inside the slider 4, and then exit through the rear mouth. The left and right engaged fastener elements 29 and 39 enter the inside of the slider 4 via the rear mouth, and then are disengaged by the coupling pillar inside the slider 4. Next, the disengaged fastener elements 29 and 39 exit respectively through the front mouths.

Optionally, the top wing is provided with downwardly protruding left and right flanges on its left and right side-edges. Additionally or alternatively, the bottom wing is provided with upwardly protruding left and right flanges on its left and right side-edges. The arrangement of the flanges allows the fastener elements 29,39 to smoothly move in the Y-shaped element passage.

Front stop 5 and the rear stop 6 are attached to the left and right fastener tapes 21 and 31 through injection molding. The front stop 5 defines a front stop position for the slider 4. The rear stop 6 defines a rear stop position for the slider 4. Stop members such as the front and rear stops 5 and 6 are formed through injection molding likewise the fastener element and adhere to the fastener tapes. Note that the stop member adheres to both of the left and right fastener tapes unlike the fastener elements, and is larger in size than the fastener elements. Namely, a larger number of through-holes are formed therein compared with a fastener element.

Method of producing a fastener stringer will be discussed with reference to FIGS. 4-10. As shown in FIG. 4, extrusion (S101), perforation (S102), plasma treatment (S103) and finally injection molding (S104) will be conducted. Two fastener stringers produced as such will be engaged by a slider to be a fastener chain, followed by injection molding for the front stop 5 and the rear stop 6.

The extrusion (S101) may be performed for example by using an extruder shown in FIG. 5. Specifically, a tape base fabric 25 and a melted or softened material 26', which will solidify into the waterproof layer 26, are supplied to an extruder mold 111, and the sides of the tape base fabric 25 is coated by the melted or softened material 26' which in turn solidify into the waterproof layer 26 on the sides of the tape base fabric 25.

The extruder mold 111 has a conveyance channel for the tape base fabric 25 conveyed from the upstream side to the downstream side, and a supply channel for supplying the melted or softened material 26' to the both upper and lower surfaces of the tape base fabric 25 while being conveyed through the conveyance channel. The tape base fabric 25 is inserted into the conveyance channel of the extrusion mold 111 and moves from the upstream side to the downstream side through the conveyance channel. The supply channel of the extruder mold 111 is filled by the melted or softened material 26' with high temperature and high pressure supplied from a feeder such as a screw. In such a manner, the melted or softened material 26' is coated to be a layer on the upper and bottom surfaces of the tape base fabric 25. Viscosity and supply pressure of the melted or softened material 26' would be adjusted appropriately for formation of layer with a target thickness. The melted or softened material 26' is cooled (e.g. in air or in liquid) and solidified, and then adheres to the tape base fabric 25 as the waterproof layer 26. Note that, a conveyance system for the tape base fabric 25 such as grippers, rolls and so on may be employed, not illustrated in FIG. 5 though.

Prior to the extrusion, a plasma treatment or corona treatment is applied to one or both of the upper and lower surfaces of the tape base fabric 25. This enables the modification of surface of the side-edge portion of the tape base fabric 25, facilitating adhesion of the melted or softened material 26' to the surface of the tape base fabric 25. Preferably, a region positioned between the left and right side-edges (e.g. a region positioned away from one side-edge by a predetermined distance (e.g. 5 mm to 15 mm)), which extends along the elongation direction of the tape base fabric 25, is subjected to the plasma treatment or corona treatment. Note that, both of the plasma and corona treatments are a surface treatment based on discharge phenomenon. Plasma (plasma beam), where negatively charged electrons and positively charged cations fly around in space, is irradiated in the plasma treatment. Electrons emitted from electrode and associated negative ions are irradiated in the corona treatment.

In FIG. 5, plasma emitters 121 and 122 are arranged at both upper and lower sides of the tape base fabric 25 in the upstream position of the extruder mold 111. The plasma emitter 121,122 emits a plasma generated by non-illustrated (common or separate) plasma source(s) to the surface of the side-edge portion of the tape base fabric 25. Typically, the plasma source has a gas channel and an electrode for exciting a plasma from a gas flowing through the gas channel. Air may be employed as the gas to be plasma-excited, for example. Once subjected to irradiation of plasma, hydrophilic functional groups are formed on the surfaces of threads of the tape base fabric 25, thus increasing its wettability. Moreover, the surfaces of the threads of the tape base fabric 25 are slightly roughened. Such modification on the surfaces of the threads of the tape base fabric 25 allows increased adhesion of the melted or softened material 26' (in turn of the waterproof layer 26) to the threads of the tape base fabric 25.

Likewise the plasma treatment (S103) described below, a plasma-irradiated region (a plasma spot) is formed in a section corresponding to or limited to the side-edge portion of the tape base fabric 25. The spot diameter of the plasma-irradiated region may preferably be less than 2 times or less than 1.5 times of the width of the side-edge portion of the tape base fabric 25 in the left-right direction. Needless to say, the tape base fabric 25 may be subjected to the plasma treatment or the corona treatment independently and separately to the extrusion. It should be noted that, the hydrophilic functional groups disappear as time progresses, and thus the extrusion is preferably performed without delay from the irradiation of plasma.

In perforation (S102), through-holes 9 piercing the fastener tape 21,31 are formed at a constant pitch along the side-edge portion of the fastener tape 21,31. Perforator illustrated in FIG. 6 may be used for example. The perforator has one or plural (in the illustrated case, three) vertically movable punches 131, a supporting stage 132 arranged beneath the punches 131, and rolls 134-137 for conveying the fastener tape 21,31. The fastener tape 21,31 is conveyed from upstream side to downstream side, and is stopped intermittently and perforated by the punches 131. The punches 131 are moved down to form the through-holes 9 piercing the fastener tape 21,31 and are moved to enter into the holes 132*h* in the supporting stage 132. Shred wastes caused by the tape base fabric 25 pierced by the punches would fall and would be collected by a collecting box 133.

Note that the bottom tip of the punch 131 should not be limited to a single-edge shape such as the illustrated one but might be shaped to be double-edge or other sharp shapes. The number of punches 131 should be arbitrary and may be one, two or three or more depending to cases. Through the perforation, the fastener tape 21,31 shifts from a condition illustrated in FIG. 8 to a condition illustrated in FIG. 9.

In plasma treatment (S103), the plasma treatment is applied to the side-edge portion of the fastener tape 21,31 on one or both surfaces of the fastener tape 21,31 so as to form activation region(s) on the surface(s) of the waterproof layer 26. Note that the corona treatment may alternatively be performed in lieu of the plasma treatment. The activation region is an area where hydrophilic functional groups are formed on the surface of the waterproof layer 26 and/or an area where the surface of the waterproof layer 26 is roughened. The hydrophilic functional groups reduce as time progresses from a time point of irradiation of plasma. Thus, it would be preferable not to interpose a delay window between the plasma treatment (S103) and the injection molding (S104). In some cases, the injection molding (S104) is performed within one week or 48 hours from the completion of the plasma treatment (S103).

As illustrated in FIG. 6, plasma emitters 138 and 139 are arranged at the both upper and lower sides of the fastener tape 21,31 at the downstream side of the perforator (punches 131). The plasma emitter 138,139 emits a plasma generated by a plasma source to the surface of the fastener tape 21,31. As the plasma is irradiated, hydrophilic functional groups are generated on the surface of the waterproof layer 26, thus increasing its wettability. Moreover, the surface of the waterproof layer 26 is slightly roughened. Such modification on the surface of the waterproof layer allows increased adhesion of melted resin (in turn the fastener elements 29, 39) to the waterproof layer 26.

As illustrated in FIG. 9, a plasma-irradiated region (plasma spot) SP is formed on the surface of the waterproof layer in the side-edge portion of the fastener tape. In this setting, the fastener tape is conveyed from the upstream side to the downstream side, and an activation region is continuously formed along the elongation direction of the fastener tape. The plasma-irradiated region SP is formed corresponding to or limited to the side-edge portion 23, 33, suppressing the consumption of power required for the plasma generation. The spot diameter of the plasma-irradiated region SP may preferably be greater than the diameter of the through-hole 9. The spot diameter of the plasma-irradiated region SP may preferably be less than 2 times or less than 1.5 times of the width of the side-edge portion 23,33 in the left-right direction.

In the side-edge portion 23,33, the plasma-irradiated region SP is formed across a region (hereinafter referred to as an adhesion region) to which the fastener element 29,39 will adhere and a region (hereinafter referred to as a non-adhesion region) to which the fastener element 29,39 will not adhere. The same applied to the activation region. Note that, the non-adhesion region is a region interposed between the adhesion regions. The plasma treatment may be more suitable over the corona treatment for a purpose of suppressing the increased roughness of the non-adhesion region. Condition on irradiation of plasma may preferably be adjusted to lower the degree of surface roughness of the waterproof layer 26. Preferably, the flow rate of plasma irradiation gas is 1400 L/h to 1800 L/h; the type of gas is air; the conveyance speed of fastener tape is 5 m/min to 15 m/min; the distance between the plasma emitter and the fastener tape directly beneath the emitter is 5 mm to 50 mm; and the output power of plasma ranges from 300 W to 500 W.

The plasma treatment or corona treatment may be performed or not performed in a region to which a stop member such as front and rear stops adheres. For example, the plasma is emitted intermittently or shield is used to interrupt the emitted plasma. In this instance, the plasma is emitted to the adhesion region and the non-adhesion region of the fastener elements, and the plasma is not irradiated to the region to which the stop member will adhere.

After the perforation (S102), there may be cases where threads or fibers are left in the through-hole 9. The threads or fibers in the through-hole 9 may be a part of thread of the tape base fabric 25 protruding into the through-hole 9, a thread waste cut from a thread of the tape base fabric 25 and left in the through-hole 9, or a fiber waste caused at the time of perforation of the tape base fabric 25. In some cases, the plasma treatment (S103) is performed not before the perforation (S102) but after the perforation (S102). This allows to remove the threads or fibers in the through-hole 9. The threads or fibers in the through-hole 9 are suppressed from flowing to the surfaces of the fastener elements 29, 39 in the period of injection molding and are suppressed from appearing on the surfaces of the fastener elements 29,39 in visible manner. Note that this problem becomes particularly evident in case where the color of fastener element 29 and the color of the threads of the tape base fabric 25 are different, but should not be limited to such a case. We consider that the threads or fibers disappear or fall or are cut off as receiving energy from the plasma.

Separate plasma treatment device may be utilized which is provided independently to the perforator. In this case either, the plasma treatment device would emit the plasma to the side-edge portion of the fastener tape on its one or both sides to form the activation region on the surface of the waterproof layer. For example, the fastener tape supplied from the perforator is wound about a reel. The plasma treatment device unreels the fastener tape from the reel and performs the plasma treatment thereto.

In the injection molding (S104), the fastener elements are injection molded, and the fastener elements are attached to the side-edge portion of the fastener tape. Before solidifying into the fastener element, the melted resin adheres to the activation region of the waterproof layer 26 and fills the through-hole 9 in the side-edge portion 23,33. The fastener element is attached to the activation region formed on the surface of the waterproof layer 26 by the irradiation of plasma, thus enhancing the adhesion strength of the fastener element to the waterproof layer 26.

The injection molding (S104) is performed using an injection molding apparatus where upper mold 141 and lower mold 142 are attached to a mold-clamping device. As illustrated in FIG. 7, the fastener tape 21,31 is supplied and sandwiched between the lower mold 142 and the upper mold 141. The lower mold 142 and the upper mold 141 define a molding cavity 146, and the through-hole 9 in the side-edge portion 23,33 is positioned in this molding cavity 146. Melted resin is supplied into the molding cavity 146 through a channel (sprue, runner and gate) in the mold and the molding cavity 146 is filled with the melted resin. The melted resin adheres to the activation region of the surface of the waterproof layer 26, and flows into the through-hole 9 formed in the side-edge portion. As the upper and lower molds 141 and 142 are cooled, the melted resin is solidified and the fastener element is attached to the side-edge portion 23,33. The melted resin, having flowed into the molding cavity 146, is solidified to include the filling portion 71 (corresponding to the through-hole 9), the upper portion 72 (corresponding to the upper space of cavity), and the lower portion 73 (corresponding to the lower space of cavity). Note that detail descriptions on the injection molding apparatus, e.g. extruder, mold clamping device or the like are omitted.

One through-hole 9 is associated with one fastener element 29,39. The diameter of the through-hole 9 is appropriately set to allow the melted resin to flow into the through-hole 9 and/or to flow between the upper space and the lower space via the through-hole 9. In the case where the diameter of the through-hole 9 is too small, unfilled spaces may possibly be formed. In the case where the diameter of the through-hole 9 is too large, the contact area between the fastener element 29, 39 and the fastener tape 21, 31 would be smaller. Note that, from a viewpoint of enlarged contact area or from other viewpoints, the upper portion 72 and the lower portion 73 may preferably have the shoulders 74 and/or fins 75 additionally to the head 76, the neck 77 and the body 78.

In the present embodiment, the plasma treatment or the corona treatment is applied to the surface of the waterproof layer to which the fastener elements will adhere before the fastener elements is injection molded to adhere to the fastener tape. As a result of this, adhesion energy of the fastener element to the surface of the waterproof layer 26 is increased notably, thus reducing the occurrence of the element-turn remarkably. Furthermore, by performing the plasma or corona treatment after the perforation, the threads or fibers in the through-hole 9 may be removed as being irradiated by the plasma, thus avoiding or suppressing the appearance of the threads or fibers on the surfaces of the fastener elements.

One may envision that two through-holes are associated with one fastener element so that the element-turn would be suppressed. However in this case, the contact area between the fastener element and the waterproof layer may be reduced as the number of through-hole increases. Moreover, the diameter of through-hole may be obliged to be smaller, inviting possible short shot.

The sliders 4 of the waterproof slide fasteners 1 have a higher sliding resistance. There may be a case where a lubricant (e.g. grease) which is other than recommended lubricants is applied to the left and right lines of the fastener elements 29, 39 in order to smoothly move the slider 4. When operation of opening and closing of slide fastener with sufficient force is repeated in such an unusual circumstance, there is a possibility of facilitated removal of fastener element off the waterproof layer as the grease enters between the fastener element and the waterproof layer. In the present embodiment, the element-turn would be effectively hindered even if the fastener elements were placed in a chemically severe environment as noted above, which is demonstrated by the example described below.

Note that in a case where the side-edge portion 23,33 of the fastener tape 21, 31 is a smooth surface, there is a higher likelihood for the melted resin to enter into a clearance between the fastener tape 21, 31 and the lower or upper mold. Again, the plasma treatment may be replaced with the corona treatment, but similar effect is still envisioned.

Working Example 1

The side-edge portion of the tape base fabric woven from polyester threads was irradiated by plasma on its both surfaces (which may be referred to as a first plasma irradiation hereinafter). Next, a waterproof layer made of polyurethane was formed onto the both surfaces of the tape base fabric through extrusion. Thickness of the waterproof layer at the one side was about 0.2 mm. Next, the through-holes were formed at a pitch of 5 mm in the side-edge portion along the elongation direction of the fastener tape. The through-hole pierces the tape base fabric of the fastener tape and pierces the waterproof layer formed onto the upper and lower surfaces of the tape base fabric. Next, the side-edge portion of the fastener tape was irradiated by the plasma on its both surfaces (which may be referred to as a second plasma irradiation hereinafter). Next, the fastener elements of polyamide were formed through injection molding and were attached to the side-edge portion of the fastener tape. Two fastener stringers were prepared following such processes, and were coupled by a slider in a separable manner. Note that the extrusion was performed within 48 hours after the first plasma irradiation. Similarly, the injection molding was performed within 48 hours after the second plasma irradiation.

Next, a test was conducted to evaluate the adhesion strength of the fastener element to the waterproof layer. We now refer to FIGS. 11 and 12 for further description. Firstly, we removed one of the upper and lower portions of one fastener element S29 which is an object to be measured and is located at a middle (substantially middle) position between the both ends of the fastener stringer. We inserted a blade of a cutting tool such as a nipper or the like between the fastener tape and the upper portion 72 or the lower portion 73 to cut the filling portion 71. Note that, the lower portion 73 of the fastener element S29 was removed in FIG. 11, but it could be the upper portion 72 that is removed alternatively.

Next, a load curve was generated by measuring a load (unit: Newton (N)) required for displacement of the remainder of the upper portion 72 or the lower portion 73 of the fastener element S29 while moving the remainder of the upper portion 72 or the lower portion 73 of the fastener element S29 away from an overlap of the ends of the waterproof fastener stringer. As illustrated in FIG. 12, the upper grippers 120 gripped the remainder of the upper portion 72 or the lower portion 73 of the fastener element S29. Also, the lower grippers 130 gripped the overlap of the both ends of the fastener stringer. As the upper grippers 120 moved upwardly, the fastener element S29 was moved upwardly and was finally removed off the fastener tape (the waterproof layer). The load curve was generated by measuring the upward load (unit: Newton (N)) applied to the upper grippers 120 for the upward movement (unit: millimeter (mm)) of the upper grippers 120. Note that, the illustration of fastener elements between the grippers 120 and 130 is omitted in FIG. 12.

FIG. 13 shows a load curve of working example 1. In the load curve shown in FIG. 13, an interval can be set between a start line and an end line by setting the start line orthogonal to the displacement axis and at a position corresponding to an initial maximum value (about 61.5 N) of the measured load value, and by setting the end line orthogonal to the displacement axis and at a position corresponding to "measured load value=zero". In a time window between the initial value and the maximum value, the waterproof layer is pulled away from the tape base fabric and at the maximum value, the waterproof layer is separated locally from the tape base fabric. After passing the maximum value, the fastener element (the remainder of the upper and lower portions) is pulled away from the waterproof layer. The area of the load curve (unit: N*mm) in the above interval reflects an adhesion energy of the fastener element to the waterproof layer. The adhesion energy (N*mm) is proportional to the area of the load curve after passing the initial maximum value of the measured load value, and reflects the adhesion energy of the fastener element to the waterproof layer.

The adhesion energy can be calculated by integrating the load curve in the above-described interval. In detail, the load curve is plotted based on measurements of load applied to the upper grippers 120 by each 0.1 mm displacement of the upper grippers 120. The start point for the integration is set to a load value at which the measured load value is maximum. The end point for the integration is set to a load value at which the measured load value is zero. Small areas are calculated based on continuously measured values of load and this calculation repeatedly continues from the start point of integration toward the end point of integration. The small area can be calculated based on a formula=((First value of load+Second value of load)/2)*0.1. By summing the small areas calculated as such, the area of the load curve can be determined. Note that, software available from INSTRON can be used for this calculation, not necessarily limited to this though.

Note that, we confirmed dispersion of maximum value among the samples. Chart 1 shows values of maximum value for respective samples which were produced based on the working example 1. The average value of the maximum values was 58.24 N. As understood from the Chart 1, if the adhesion energy (N·mm) is denoted by S, S>200 is satisfied, and preferably S>300 or S>400 is satisfied. This is a result of the above-described feature, i.e. the irradiation of plasma to the surface of the waterproof layer, to which the fastener element will adhere, before the injection molding through which the fastener elements are attached to the fastener tape.

CHART 1

| Sample number | Maximum value (N) | Adhesion energy (N · mm) |
|---|---|---|
| 1 | 61.1 | 412.5 |
| 2 | 58.2 | 470.2 |
| 3 | 57.5 | 441.3 |
| 4 | 56.9 | 483.2 |
| 5 | 58.6 | 437.2 |

CHART 1-continued

| Sample number | Maximum value (N) | Adhesion energy (N · mm) |
|---|---|---|
| 6 | 56.9 | 445.5 |
| 7 | 58.7 | 473.5 |
| 8 | 59.1 | 456.4 |
| 9 | 57.6 | 519.4 |
| 10 | 57.8 | 432.6 |

Comparative Example 1

Fastener stringers were produced and evaluated in the same condition as in the working example 1 except that the first and second irradiations of plasma were omitted. FIG. 14 shows the load curve of the comparative example 1. In this comparative example, S<200 is satisfied when the adhesion energy is denoted by S. Therefore, sufficient adhesion energy was not obtained compared with that of the working example 1.

Note that, we confirmed dispersion of maximum value among the samples also in the comparative example. Chart 2 shows maximum values of respective samples produced based on the comparative example 1. The average value of the maximum value is 37.3 N. The adhesion energy (N·mm) shown in Chart 2 corresponds to the area of the load curve in the interval equivalent to that in the working example 1, and reflects the adhesion energy of the fastener element to the waterproof layer.

CHART 2

| Sample number | Maximum value (N) | Adhesion energy (N · mm) |
|---|---|---|
| 1 | 41.2 | 101.9 |
| 2 | 42.7 | 92.1 |
| 3 | 42.8 | 83.4 |
| 4 | 38.7 | 83.7 |
| 5 | 35.1 | 75.2 |
| 6 | 31.7 | 41.1 |
| 7 | 35.6 | 80.1 |
| 8 | 30.6 | 54.3 |

Working Example 2

Fastener stringers were produced and evaluated in the same condition as in the working example 1 except that the first irradiation of plasma was omitted. FIG. 15 shows the load curve of the working example 2. In this working example 2, S>200 was satisfied similar to the working example 1. The maximum value was about 54 N.

Further, opening-closing test was conducted for the working example 1 and the comparative example 1. In the opening-closing test, the slider is reciprocated in the front-rear direction in the slide fastener, and it is determined if the number of reciprocating of the slider reaches a target number without causing the element-turn. If the element-turn occurred before reaching the reciprocation target number, the opening-closing test was terminated. In this opening-closing test, a grease was applied to the fastener elements in order to facilitate the element-turn. Further, the distance of movement of slider was set to 600 mm, and the speed of its movement was set to 900 mm/s. Still further, the test was conducted in a condition where a force of 3 kgf is constantly applied to the slide fastener in its elongation direction, and a force of 0.1 kgf is constantly applied thereto in its width direction (i.e. the test was conducted while the slide fastener was stretched to the front, rear, left and right sides). As seen in the result of the opening-closing test of Chart 3, remarkably beneficial outcome was obtained in the working example 1 compared with the comparative example 1.

CHART 3

|  | Working example 1 | Comparative example 1 |
|---|---|---|
| Result | No element-turn even up to 20,000 times | Element-turn occurred at 650 times |

FIGS. 16 and 17 show conditions where a thread or fiber inside the through-hole is removed by the second irradiation of plasma in the working example 1.

Note that, fastener elements of the same or equivalent size were used in the load test and in the opening-closing test. In the load test and the opening-closing test described above, the area of the surface of the waterproof layer to which a fastener element adheres at one side of the fastener stringer is 17.08 mm$^2$±0.2 mm$^2$ (more accurately, 17.08 mm$^2$ 0.1 mm$^2$ in the above-described working and comparative examples). Note that, the area of through-hole (the area defined by inner wall surface of through-hole) is not included in this area.

A skilled person in the art would be able to add various modifications to the respective embodiments based on the above teachings. Reference signs in Claims are added just for a purpose of reference and should not be referred to for narrowly construing the scope of Claims.

The fastener tape is not limited to be produced through extrusion, but may be produced by attaching the waterproof layer onto the tape base fabric by pressure.

LIST OF SIGNS

1 Slide fastener
2 Fastener stringer
3 Fastener stringer
21 Fastener tape
23 Side-edge portion
25 Tape base fabric
26 Waterproof layer
29 Fastener element
31 Fastener tape
33 Side-edge portion
39 Fastener element

The invention claimed is:

1. A method of producing a waterproof fastener stringer, the method comprising:
   forming through-holes at a constant pitch along a side-edge portion of a fastener tape where a tape base fabric is covered by a waterproof layer, the through-holes piercing the fastener tape;
   applying a plasma treatment to the side-edge portion of the fastener tape so as to form an activation region on a surface of the waterproof layer on one or both sides of the fastener tape; and
   performing an injection molding of fastener elements to attach the fastener elements to the side-edge portion of the fastener tape, a melted resin adhering to the activation region and filling the through-hole before solidifying into the fastener element,
   the method further comprising: applying a plasma treatment to the tape base fabric before the tape base fabric is covered by the waterproof layer.

2. The method of producing a waterproof fastener stringer of claim 1, wherein the plasma treatment is applied to the side-edge portion of the fastener tape after the through-holes are formed in the side-edge portion of the fastener tape.

3. The method of producing a waterproof fastener stringer of claim 2, wherein the plasma treatment is applied to the side-edge portion of the fastener tape so as to remove a thread or fiber of the tape base fabric in the through-hole.

4. The method of producing a waterproof fastener stringer of claim 1, wherein said applying a plasma treatment or corona treatment to the side-edge portion of the fastener tape so as to form an activation region on a surface of the waterproof layer on one or both sides of the fastener tape includes:
   forming a plasma-irradiated region on the surface of the waterproof layer in the side-edge portion of the fastener tape; and
   conveying the fastener tape from an upstream side to a downstream side, wherein
   the activation region is formed continuously along an elongation direction of the fastener tape.

5. The method of producing a waterproof fastener stringer of claim 4, wherein a spot diameter of the plasma-irradiated region is greater than a diameter of the through-hole.

6. The method of producing a waterproof fastener stringer of claim 5, wherein a spot diameter of the plasma-irradiated region is less than 2 times or 1.5 times of a width of the side-edge portion.

7. The method of producing a waterproof fastener stringer of claim 4, wherein a spot diameter of the plasma-irradiated region is less than 2 times or 1.5 times of a width of the side-edge portion.

8. The method of producing a waterproof fastener stringer of claim 4, wherein said applying a plasma treatment to the side-edge portion of the fastener tape so as to form an activation region on a surface of the waterproof layer on one or both sides of the fastener tape is performed to skip a portion where a stop member is to be formed in the side-edge portion of the fastener tape.

9. The method of producing a waterproof fastener stringer of claim 4, wherein the fastener element includes: a filling portion that fills the through-hole; an upper portion connected to an upper end of the filling portion; and a lower portion connected to a lower end of the filling portion,
   each of the upper and lower portions has a head, a neck and a body, and
   an end face of the side-edge portion of the fastener tape is positioned in a groove between the head of the upper portion and the head of the lower portion.

10. The method of producing a waterproof fastener stringer of claim 1, wherein said applying a plasma treatment to the side-edge portion of the fastener tape so as to form an activation region on a surface of the waterproof layer on one or both sides of the fastener tape is performed to skip a portion where a stop member is to be formed in the side-edge portion of the fastener tape.

11. The method of producing a waterproof fastener stringer of claim 1, wherein said applying a plasma treatment to the tape base fabric before the tape base fabric is covered by the waterproof layer includes:
    forming a plasma-irradiated region on a surface of the tape base fabric; and
    conveying the tape base fabric from an upstream side toward a downstream side.

12. The method of producing a waterproof fastener stringer of claim 1, wherein the waterproof layer is formed onto both upper and lower surfaces of the tape base fabric through the injection molding.

13. The method of producing a waterproof fastener stringer of claim 1, wherein the waterproof layer is made of polyurethane, and the fastener element is made of polyamide.

14. The method of producing a waterproof fastener stringer of claim 1, wherein the fastener element includes: a filling portion that fills the through-hole; an upper portion connected to an upper end of the filling portion; and a lower portion connected to a lower end of the filling portion,
- each of the upper and lower portions has a head, a neck and a body, and
- an end face of the side-edge portion of the fastener tape is positioned in a groove between the head of the upper portion and the head of the lower portion.

15. The method of producing a waterproof fastener stringer of claim 14, further comprising:
- removing one of the upper portion and the lower portion of one fastener element positioned at a middle between both ends of the waterproof fastener stringer;
- moving a remainder of the upper portion and the lower portion away from an overlap of the both ends of the waterproof fastener stringer and measuring a load required for displacement of the remainder to generate a load curve; and
- calculating an area of the load curve in an interval in which a measured load value changes from an initial maximum value to zero, wherein
- S>200 is satisfied where S denotes the area (unit: N*mm) of the load curve in the interval.

16. A method of producing a waterproof fastener stringer, the method comprising:
- applying a first plasma treatment to a tape base fabric;
- covering the tape base fabric with a waterproof layer to configure a fastener tape;
- forming through-holes at a constant pitch along a side-edge portion of the fastener tape, the through-holes piercing the fastener tape;
- applying a second plasma treatment to the side-edge portion of the fastener tape so as to form an activation region on a surface of the waterproof layer on one or both sides of the fastener tape; and
- performing an injection molding of fastener elements to attach the fastener elements to the side-edge portion of the fastener tape, a melted resin adhering to the activation region and filling the through-hole before solidifying into the fastener element.

* * * * *